(No Model.)
R. G. PETWAY.
VEHICLE HUB.
No. 495,367. Patented Apr. 11, 1893.
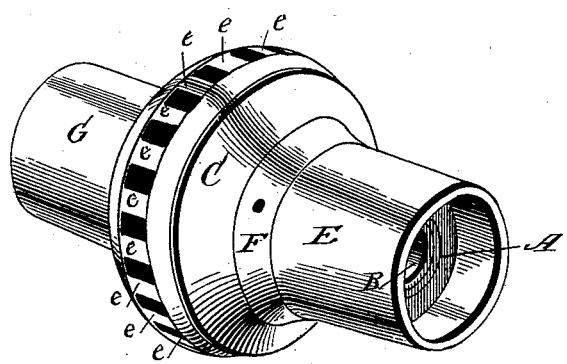
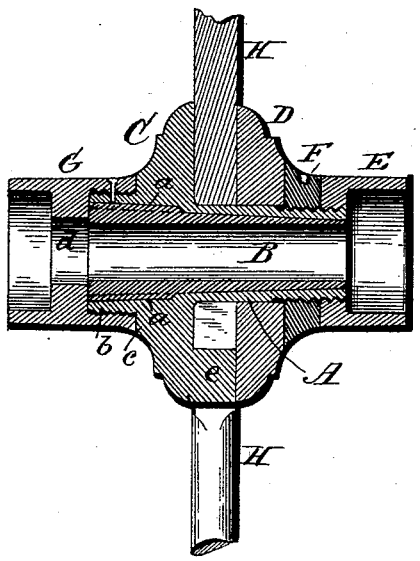 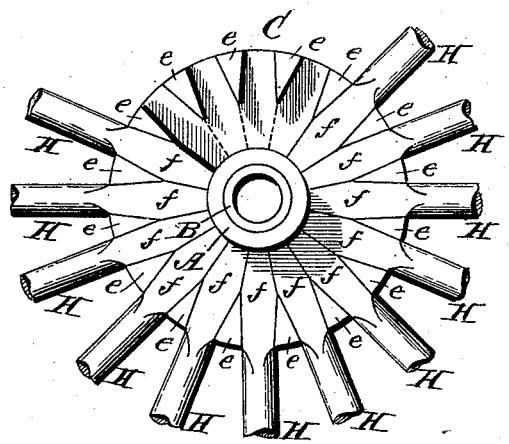
Witnesses
L. C. Hills
S. J. Smith
Inventor
Robert G. Petway.
per Chas. N. Fowler
Attorney

UNITED STATES PATENT OFFICE.

ROBERT GORDON PETWAY, OF WHITE BLUFFS, TENNESSEE.

VEHICLE-HUB.

SPECIFICATION forming part of Letters Patent No. 495,367, dated April 11, 1893.

Application filed November 4, 1892. Serial No. 450,987. (No model.)

*To all whom it may concern:*

Be it known that I, ROBERT GORDON PETWAY, a citizen of the United States, residing at White Bluffs, in the county of Dickson and State of Tennessee, have invented certain new and useful Improvements in Vehicle-Hubs; and I do hereby declare that the following is a full, clear, and exact description of the same, reference being had to the annexed drawings, making a part of this specification, and to the letters of reference marked thereon.

The present invention has relation to that class of vehicle hubs constructed wholly of metal and in which the spokes are held between clamping plates, and the object thereof is to improve the construction whereby the hub will be increased in strength, more effective in holding the spokes in position, and the hub materially enhanced in value. These several objects I attain by the construction substantially as shown in the drawings and hereinafter described and claimed.

Figure 1 of the drawings represents a perspective view of my improved hub; Fig. 2, a longitudinal central section thereof; Fig. 3 a plan view showing the position of the spokes with relation to each other.

In the accompanying drawings A represents the usual metal tube into which is inserted the axle-box B having at its larger end feathers $a$ diametrically opposite each other which fit in correspondingly shaped grooves in the tube. The tube A has exterior screw threads at one end and at its opposite end is cast with an annular flange C which has upon its outer side an annular rim $b$ and shoulder $c$, as shown in Fig. 2. A clamping-plate D is slipped over the tube A and holds the spokes between it and the flange C, said plate being forced tightly up against the spokes by means of the nose-band E which also acts as a jam-nut. Between the nose-band E and the clamping plate D is a nut F said nut as well as the nose-band having interior screw threads to engage with the screw threads on the tube A.

The band G at the inner end of the hub, has screw threads upon its interior to engage with the exterior screw threads on the rim $b$, and also is cast with an interior shoulder $d$ which abuts against the end of the axle-box to hold it in place.

The flange C upon its inner side is cast with wedge-shaped lugs $e$ arranged with relation to each other as shown in Fig. 3, the base or greatest width of the lugs extending on a line with the outer rim or edge of the flange C and the apex of the angle formed by the sides of the lugs extending about half way across that portion of the flange from the outer edge to the tube A. The wedge shape form of the lugs $e$ leave a space between them that slightly tapers to receive the tapering form of the inner end of the spokes H.

The inner end $f$ of the spokes has a double taper as shown in Fig. 3, and when in position the sides of the upper taper bear against the sides of the lugs $e$ and the sides of the lower taper bear firmly against the sides of the spoke next to it, thereby preventing shrinkage and forming a solid and firm connection to the spokes, each spoke acting as a brace to the spoke next to it, the double taper on the spokes preventing any longitudinal movement thereof.

Having now fully described my invention, what I claim as new, and desire to secure by Letters Patent, is—

In a vehicle-hub, the clamping plate and interposed screw-nut between it and the nose-band, in combination with the tube having exterior screw threads at its end and cast with an annular flange having upon its inner side suitable lugs for the spokes to abut against, an annular screw threaded rim and shoulder to receive a suitable nose-band, substantially as and for the purpose set forth.

In testimony that I claim the above I have hereunto subscribed my name in the presence of two witnesses.

ROBERT GORDON PETWAY.

Witnesses:
W. D. CORLEN,
J. W. BOONE.